July 19, 1955
G. W. CURTIS
2,713,521
ENDLESS BAND TRACKS FOR TRACK TYPE TRACTORS
Filed Oct. 27, 1951
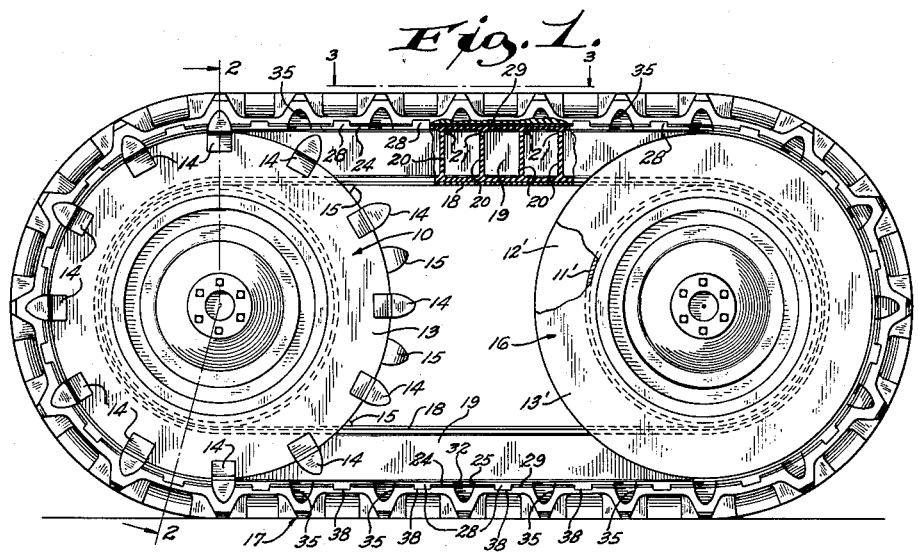
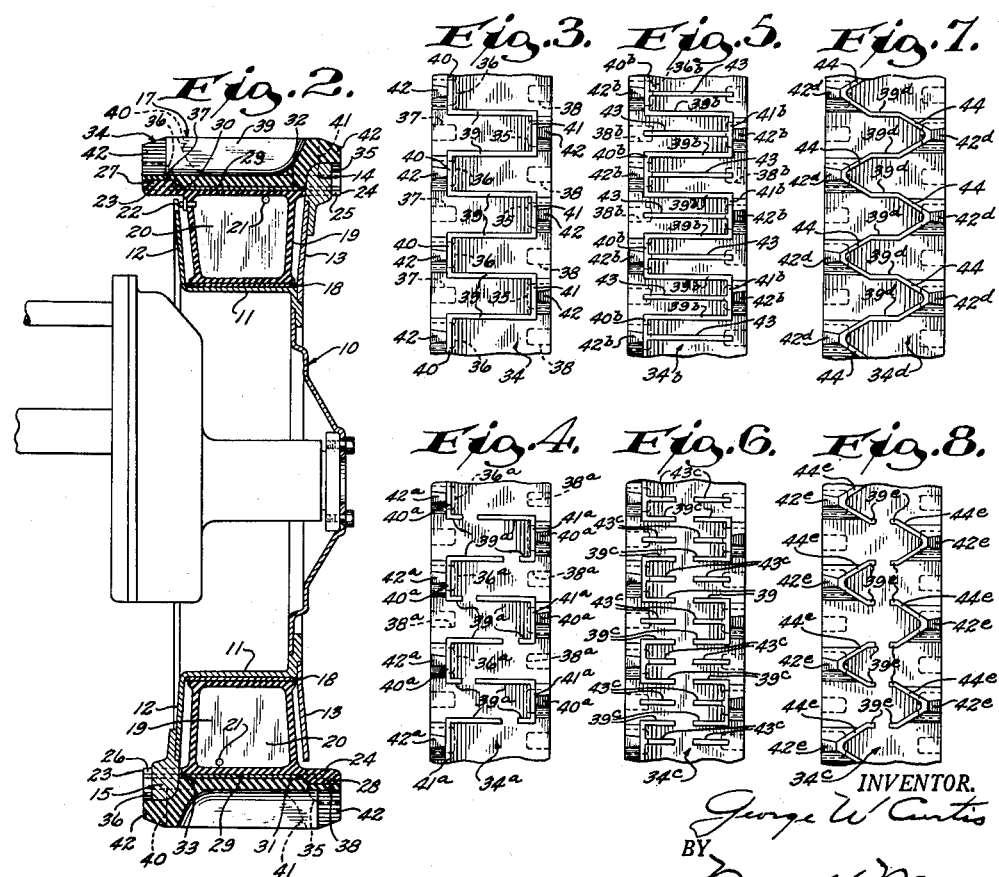
INVENTOR.
George W. Curtis
BY
Morsell & Morsell
ATTORNEYS.

United States Patent Office 2,713,521
Patented July 19, 1955

2,713,521

ENDLESS BAND TRACKS FOR TRACK TYPE TRACTORS

George W. Curtis, Wauwatosa, Wis.

Application October 27, 1951, Serial No. 253,511

2 Claims. (Cl. 305—10)

This invention relates to improvements in endless band tracks for track type tractors.

It is a general object of the present invention to provide an improved endless band track having rigidifying means embodied therein to render the straight stretches of the track self-supporting and thereby eliminate the need for auxiliary supporting means, such as the truck rollers which are usually employed on track-type tractors.

A further object of the invention is to provide an improved endless band track which is of molded construction, having a pair of radially spaced, endless rigidifying members incorporated therein, said members being spaced apart a distance sufficient to magnify the rigidifying function to a point where the track is self supporting.

A more specific object of the invention is to provide an improved endless band track of the class described wherein the rigidifying members are held in uniform, radially spaced relationship by an endless inflatable separator which is positioned therebetween.

A further specific object of the invention is to provide an improved endless band track of the class described wherein the inflatable separator is subdivided into a plurality of compartments which are separated by radially extending transverse walls, each of said walls having an aperture therein to afford restricted communication between the compartments and thereby permit restricted flow of fluid between adjacent compartments for damping out shocks which may result from movement over rough terrain.

A further object of the invention is to provide an improved endless band track of the class described which is provided with a removable, endless tread band outwardly of the outermost rigidifying member, the removability of said tread band permitting easy replacement after it has lost its effectiveness through hard usage, wear or other cause.

A further specific object of the invention is to provide an improved endless band track of the class described wherein the rigidifying members are formed of flat metal bands, the outermost of said bands having slots formed in its opposite edge portions, the tread band being formed with recesses in its inner surface which are in registration with the slots of the metal band, and the inflatable separator being formed with a plurality of lugs which project through said slots and into the recesses of the tread band to anchor the tread band to the outermost metal band and to the inflatable separator.

A further object of the invention is to provide an endless band track of the class described wherein the tread band is formed with a plurality of transverse tread bars which are connected at alternate ends to form a serpentine tread pattern, thereby providing continuous ground contact and eliminating shock which results from movement of successive transverse tread bars into contact with the ground.

A further object of the invention is to provide an improved endless band track of the class described which is adapted for use with driving sprockets and idler wheels of a type which are channel shaped in peripheral cross section to receive the inner metal band and the inflatable separator, the inflatable separator being formed at each side with a peripheral, laterally directed endless flange which is located radially outwardly of the peripheries of said sprocket and idler wheels, and the outer metal band and tread band overlying the inflatable separator and its peripheral flanges.

A further object of the invention is to provide an improved endless band track of the class described which is adapted for use with a driving sprocket of a type having a channel shaped periphery and having driving teeth projecting radially from each side of its periphery, the separator flanges, outer metal band, and tread band being formed with registering recesses for receiving the driving teeth of said sprocket.

With the above and other objects in view, the invention consists of the improved rigidified endless track, and all of its parts and combinations, as set forth in the claims, and all equivalents thereof.

In the drawing accompanying and forming a part of this specification, wherein is shown one complete embodiment of the preferred form of the invention, and wherein like characters of reference indicate the same parts in all of the views:

Fig. 1 is a side elevational view, partly in section, showing the improved endless band track operatively associated with a driving sprocket and an idler wheel;

Fig. 2 is a transverse, vertical sectional view taken approximately along the line 2—2 of Fig. 1;

Fig. 3 is a fragmentary plan view of the improved endless band track taken approximately along the line 3—3 of Fig. 1;

Fig. 4 is a view similar to Fig. 3 showing a modified form of tread pattern wherein the transverse tread bars are interrupted intermediate their length;

Fig. 5 is a view similar to Fig. 3 showing a modified form of tread pattern which is similar to that illustrated in Fig. 3 but which has additional transverse tread bars;

Fig. 6 is a view similar to Fig. 5 showing a modified form of tread pattern wherein the transverse tread bars of the form of Fig. 5 are interrupted intermediate their length;

Fig. 7 is a view similar to Fig. 3 showing a modified form of tread pattern wherein the transverse tread bars are relatively short in length, said tread bars being connected at alternate ends by V-shaped tread bars; and Fig. 8 is a view similar to Fig. 7 showing a modified form of tread pattern wherein the horizontal tread bars of the form of Fig. 7 are interrupted intermediate their length.

Referring more particularly to Figs. 1 and 2 the numeral 10 indicates a driving sprocket provided with a peripheral rim 11 having a pair of spaced radially outwardly directed annular flanges 12 and 13 which are preferably slightly divergent. Fixed to the peripheral edge of the flange 13 are a plurality of radially outwardly projecting driving teeth 14. Fixed to the peripheral edge of the flange 12 are a plurality of radially outwardly projecting driving teeth 15. As shown in Fig. 1, the driving teeth 15 are preferably circumferentially offset from the driving teeth 14. The numeral 16 indicates an idler wheel which may be identical with the driving sprocket 10 except that it is not provided with peripheral driving teeth.

The numeral 17 indicates an improved endless band track which is designed for use with the sprocket 10 and idler wheel 16. The endless band track 17 includes an endless flat metal band 18 which is adapted to engage the rims 11 and 11' of the wheels 10 and 16 between the flanges 12 and 13 and 12' and 13' thereof. Fixed longitudinally to the outer surface of the metal band 18 and coextensive therewith is an endless hollow band 19 of molded material which may be generally rectangular in cross sectional shape. The major portion of the band 19 is positionable between the flanges 12 and 13 and 12' and 13', the outer periphery of the band 19 projecting outwardly beyond the peripheries of said flanges. As shown in Figs. 1 and 2, the band 19 is provided with a plurality of spaced, transverse, internal partitions 20 which subdivide the interior of the band into a plurality of compartments. Each of the walls 20 is preferably formed with a restricted orifice 21 which affords communication between the compartments. The band 19 is provided with a valve 22 through which it may be inflated.

The inflatable band 19 is formed with laterally projecting endless flanges 23 and 24 having outer surfaces which are flush with the outer surface of the band 19. As shown in Fig. 2 the flanges 23 and 24 are adapted to project laterally outwardly over and beyond the flanges 12 and 13 of the wheel 10. The flange 24 is formed with a plurality of recesses 25 through which the driving teeth 14 are adapted to project. The flange 23 is formed with a plurality of similar recesses 26 through which the driving teeth 15 are adapted to project. The outer surface of the flange 23 is formed with a plurality of spaced lugs 27 which extend transversely and are opposite the recesses 25 of the flange 24. The outer surface of the flange 24 is formed with a plurality of lugs 28 which extend transversely and are opposite the recesses 26 in the flange 23.

Fixed to the outer surface of the inflatable band 19 and its flanges 23 and 24 is a flat metal endless band 29 which is substantially coextensive both longitudinally and transversely with the surface to which it is fixed. One edge of the metal band 29 is formed with a plurality of edge slots or recesses 30 through which the lugs 27 are adapted to project, and the other edge is formed with a plurality of edge slots 31 through which the lugs 28 are adapted to project. One edge of the metal band 29 is also formed with a plurality of edge slots 32 positioned to receive the driving teeth 14, and the other edge is formed with a plurality of slots 33 to receive the driving teeth 15.

Removably fixed to the outer surface of the metal band 29 is an endless tread band 34 formed of rubber or other suitable moldable material. One edge of the inner surface of the tread band 34 is formed with a plurality of recesses 35 which are in registration with the recesses 25 and 32 of the flange 24 and band 29 respectively, the recesses 35 being positioned to receive the driving teeth 14 as shown. The other edge of the inner surface of the tread band 34 is formed with a plurality of recesses 36 which register with the recesses 26 and 33 of the flange 23 and band 29 respectively, the recesses 36 being positioned to receive the driving teeth 15, as shown. The inner surface of the tread band 34 is also formed with a plurality of recesses 37 for receiving the lugs 27, and with a plurality of recesses 38 for receiving the lugs 28.

The tread band 34 is preferably formed with a plurality of equally spaced, transversely extending ground engaging tread bars 39. Adjacent each of the recesses 36, there is a circumferentially extending tread bar 40 connecting the corresponding ends of the adjacent pair of tread bars 39. Adjacent each of the recesses 35 the tread band 34 is formed on its outer surface with a circumferentially extending tread bar which connects the adjacent ends of transverse tread bars 39 as shown in Fig. 3. The circumferentially extending tread bars 40 and 41 are each formed with a laterally projecting outwardly directed lug 42, the recesses 35 and 36 projecting into said lugs from the inner surface of the tread band 34 to provide hollow interiors therefor.

Fig. 4 shows a modified form of tread band 34a which is substantially identical with the tread band 34 shown in Fig. 3 except that the transverse tread bars 39a are interrupted intermediate their length. The elements of the tread band 34a indicated by numerals with the exponent (a) are substantially identical to the corresponding elements of Fig. 3 which are designated by the same numerals without the exponents. The form of tread shown in Fig. 4 is known as the open type tread and is adapted for use under certain soil conditions.

The modified form of tread 34b shown in Fig. 5 is substantially identical with that shown in Fig. 3 except that there are extra transversely extending tread bars 43 between the tread bars 39b.

The modified form of tread band 34c shown in Fig. 6 is identical with that shown in Fig. 5 except that the transverse tread bars 39c and 43c are interrupted intermediate their lengths as shown. This form of tread band is also known as the open type and is adapted for use under certain soil conditions.

The modified form of tread band 34d shown in Fig. 7 is similar in all respects to the tread band 34 of Fig. 3 except that the transverse tread bars 39d are substantially shorter than the tread bars 39 of the band 34. In addition, the tread bars 39d are connected by V-shaped tread bars 44 instead of by the longitudinally extending tread bars 40 and 41 of Fig. 3. The modified form of tread band 34e shown in Fig. 8 is substantially identical with the tread band 34d of Fig. 7 except that the transverse tread bars 39e are interrupted intermediate their length. It will be noted that the tread bands 34d and 34e are provided with lugs 42d and 42e respectively, which lugs correspond to the lugs 42 of the tread band 34.

In operation of the improved endless band track, air is pumped into the inflatable band 19 through the valve 22 until it fills all of the compartments provided by the transverse walls 20. Sufficient pressure is maintained within the inflatable band 19 to keep the metal bands 18 and 29 separated. The separated metal bands bend freely with the track 17 as it passes around the sprocket wheel 10 and idler 16, but said bands become rigid to resist inward bending of the straight stretches of the track 17 which extend between the wheels. The greater length of the metal band 29 as compared with the metal band 18 permits the track 17 to bend freely around the wheels 10 and 16, and these bands, in combination with the inflatable separator 19, form a unit which will resist inward bending up to the point where the stresses in the bands 18 and 29 exceed the elastic limits of the bands. The design of the track 17, however, is such that under any forseeable conditions of operation the bands 18 and 29 will never be subjected to stresses which approach their elastic limits.

The amount of radial separation of the metal bands 18 and 19 has a marked effect upon the rigidity of the improved track. The wider the degree of separation of the metal bands the greater the rigidity imparted thereby to the straight stretches of the track. An increase in the degree of separation of the metal bands reduces the effort required to bend the end bights of the track longitudinally around the end sprockets, because the relative deflection of the flexible molded material between the metal bands is lessened thereby.

In operation, the rotative force of the driving sprocket 10 is transmitted to the track 17 principally through the driving teeth 14 and 15. It will be noted that the driving teeth 14 and 15 extend through or into recesses in the flanges 23 and 24, in the metal band 29, and in the tread band 17. In addition, the tread band 17 is anchored to the inflatable separator 19 through the lugs 27 and 28 and recesses 37 and 38. After the tread band 17 has lost its effectiveness through long use, wear or for other causes, it may be removed and replaced with a new tread band. The metal bands 18 and 29 as well as the inflatable separator 19 will outlast many tread bands 17. It is to be noted that the metal bands 18 and 29 serve as protective members for the inflatable separator 19, and prevent it from being subjected to the many road and field hazards which so quickly damage conventional pneumatic tires. The inflatable separator 19 may be filled with any desired fluid.

Depending upon the weight requirement of the particular operation involved, the band 19 may be filled with a liquid or with any combination of liquid and air to give the desired tractor weight.

The orifices 21, by providing restricted communication between adjacent compartments, provide resiliency in the track which results in smoother operation over rough terrain. For example, if the track should run over a stone or the like, some of the air from the compartment directly above the stone would be forced into the adjacent compartments. This air flow, however, will be retarded by the restricted nature of the orifices 21. This action provides a shock absorbing function which eliminates the bounce that normally occurs when conventional pneumatic tires travel over similar objects.

All of the tread band patterns shown in Figs. 3 to 8 illustrate a serpentine like tread bar which extends around the entire circumference of the tread band. These tread designs provide improved riding qualities by reason of the circumferential continuity of the tread bar ground engaging surface, as well as by reason of the gradual and uninterrupted circumferential approach of the tread bar surface to the ground during track movement. This contrasts with the action of conventional hinged metal shoe type track, the shoes of which engage the ground in a series of short blows or impacts which react back through the track to produce a rough riding tractor which must be driven at relatively slow speeds.

Various changes and modifications may be made without departing from the spirit of the invention, and all of such changes are contemplated as may come within the scope of the claims.

What I claim is:

1. An endless track for use in a track laying unit of a type which has spaced wheels comprising: a first endless flexible metal band which is transversely flat throughout its length adapted to coact with said wheels and having inner and outer surfaces, an endless intermediate member of flexible molded material of box-like cross section having transversely straight and parallel inner and outer surfaces throughout its length and having its inner surface fixed to the outer surface of said first metal band, a second endless flexible metal band which is transversely flat throughout its length and of greater length than said first band and having inner and outer surfaces and having its inner surface fixed to the outer surface of said intermediate member, said intermediate member being of a uniform thickness throughout its length and width and of a thickness substantially greater than the combined thicknesses of said metal bands and having uniform strength throughout its length and width to maintain a uniformly wide spacing between said first and second metal bands throughout the length and width of the latter, and endless tread means overlying the outer surface of said second metal band.

2. An endless track for use in a track laying unit of a type which has spaced wheels comprising: a first endless flexible metal band which is transversely flat throughout its length adapted to coact with said wheels and having inner and outer surfaces, a hollow inflated endless intermediate member of flexible molded material of box-like cross section having transversely straight and parallel inner and outer surfaces throughout its length and having its inner surface fixed to the outer surface of said first metal band, a second endless flexible metal band which is transversely flat throughout its length and of greater length than said first band and having inner and outer surfaces and having its inner surface fixed to the outer surface of said intermediate member, said intermediate member being of a uniform thickness throughout its length and width and of a thickness substantially greater than the combined thicknesses of said metal bands and having uniform strength throughout its length and width to maintain a uniformly wide spacing between said first and second metal bands throughout the length and width of the latter, and endless tread means overlying the outer surface of said second metal band.

References Cited in the file of this patent

UNITED STATES PATENTS

| | | |
|---|---|---|
| 1,431,376 | Davis | Oct. 10, 1922 |
| 1,966,428 | Brown | July 17, 1934 |
| 1,986,865 | Tschappat | Jan. 8, 1935 |
| 2,055,932 | Kitchen | Sept. 29, 1936 |
| 2,169,443 | Burke | Aug. 15, 1939 |
| 2,337,074 | Walker | Dec. 21, 1943 |
| 2,365,279 | Kraft | Dec. 19, 1944 |
| 2,423,579 | Buren | July 8, 1947 |
| 2,575,845 | Singer | Nov. 20, 1951 |
| 2,592,541 | Curtis | Apr. 15, 1952 |
| 2,621,085 | Bonmartini | Dec. 9, 1952 |

FOREIGN PATENTS

| | | |
|---|---|---|
| 134,189 | Great Britain | Apr. 15, 1920 |
| 466,115 | Germany | Oct. 1, 1928 |